United States Patent
Ikeyama (10) Patent No.: US 7,667,735 B2
(45) Date of Patent: Feb. 23, 2010

(54) IMAGE PICKUP DEVICE AND IMAGE PROCESSING METHOD HAVING A MASK FUNCTION

(75) Inventor: Hiromasa Ikeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 10/377,223

(22) Filed: Feb. 28, 2003

(65) Prior Publication Data

US 2003/0214592 A1 Nov. 20, 2003

(30) Foreign Application Priority Data

Mar. 1, 2002 (JP) ............... 2002-056412

(51) Int. Cl.
*H04N 5/228* (2006.01)
*H04N 9/64* (2006.01)

(52) U.S. Cl. ............... 348/208.12; 348/251; 348/223.1

(58) Field of Classification Search .............. 348/208.1, 348/223.1, 251
See application file for complete search history.

(56) References Cited

U.S. PATENT DOCUMENTS

| | | | | |
|---|---|---|---|---|
| 5,625,415 A * | 4/1997 | Ueno et al. | ............... | 348/350 |
| 6,009,209 A * | 12/1999 | Acker et al. | ............... | 382/275 |
| 6,400,908 B1 * | 6/2002 | Parulski | ............... | 396/311 |
| 6,476,868 B1 * | 11/2002 | Kaji et al. | ............... | 348/333.12 |
| 6,681,032 B2 * | 1/2004 | Bortolussi et al. | ............... | 382/118 |
| 6,744,461 B1 * | 6/2004 | Wada et al. | ............... | 348/143 |
| 6,748,110 B1 * | 6/2004 | Wallack | ............... | 382/173 |
| 6,958,773 B1 * | 10/2005 | Sato | ............... | 348/223.1 |
| 6,993,719 B1 * | 1/2006 | Edwards et al. | ............... | 715/706 |
| 7,298,400 B2 * | 11/2007 | Taguchi | ............... | 348/211.8 |
| 2002/0001464 A1 * | 1/2002 | Ohsawa | ............... | 396/50 |
| 2002/0167596 A1 * | 11/2002 | Suzuki et al. | ............... | 348/223.1 |
| 2004/0201767 A1 * | 10/2004 | Niikawa et al. | ............... | 348/333.03 |

FOREIGN PATENT DOCUMENTS

| | | |
|---|---|---|
| JP | 63 198484 | 8/1988 |
| JP | 4 310930 | 11/1992 |
| JP | 4 347813 | 12/1992 |
| JP | 5 35636 | 5/1993 |
| JP | 5 308563 | 11/1993 |
| JP | 5 91074 | 12/1993 |
| JP | 6 6801 | 1/1994 |
| JP | 6 197268 | 7/1994 |
| JP | 6 261336 | 9/1994 |

(Continued)

*Primary Examiner*—Sinh Tran
*Assistant Examiner*—Hung H Lam
(74) *Attorney, Agent, or Firm*—Frommer Lawrence & Haug LLP; William S. Frommer; Thomas F. Presson (57) ABSTRACT

There is provided an image pickup device in which an overall output image can be prevented from being affected by an image signal of a mask area. According to the image pickup device, a prescribed area in a pickup image is masked to keep the masked area non-displayed in the output image, and the image signal of the mask area is removed from a detection target for image processing to prevent the image signal of the masked area from affecting the image processing on the overall image, whereby the image processing such as automatic exposure processing, automatic white balance processing, etc can be properly performed and the image quality of the output image can be enhanced.

16 Claims, 9 Drawing Sheets

FOREIGN PATENT DOCUMENTS

| | | |
|---|---|---|
| JP | 7 81459 | 3/1995 |
| JP | 8 205021 | 8/1996 |
| JP | 11 41496 | 2/1999 |
| JP | 11 136547 | 5/1999 |
| JP | 2001 61137 | 3/2001 |
| JP | 2001 69494 | 3/2001 |
| JP | 2001 111886 | 4/2001 |
| JP | 3199793 | 6/2001 |
| JP | 2002 62580 | 2/2002 |

* cited by examiner

IMAGE PICKUP DEVICE AND IMAGE PROCESSING METHOD HAVING A MASK FUNCTION

BACKGROUND OF THE INVENTION

1. Field of the Invention

The present invention relates to an image pickup device, and particularly to an image pickup device having a mask function, and an image processing method therefor.

2. Description of the Related Art

There has been proposed an image pickup device such as a video camera device which has a mask function of outputting a pickup image with keeping a part of the image invisible (hidden). For example, JP-A-2001-69494 discloses a monitoring camera device which can display an image with masking a privacy zone at a part of the image. In this type of monitoring camera device as described above, for example when a monitoring target area contains not only monitoring target objects, but also other target objects such as private houses for which privacy protection is needed, the compatibility between the monitoring function and the privacy protection is established by masking only the target objects for which privacy protection is needed.

According to the conventional image pickup device described above, the video signal of a mask target area (mask area) is also input to automatic exposure (AE: auto exposure) and white balance (WB: white balance/auto-white balance) detection circuits for carrying out image processing to adjust image quality. Therefore, it has had such a problem that the detection results of the detection circuits are changed by image information such as brightness level, brightness variation, etc. of a mask area which is not viewable as an image, so that the overall image picked up by the image pickup device is affected by the image information of the mask area.

For example, when a private house is located in a mask area, if the house is lighted up, the average brightness level of the overall image increases due to the image information of the mask area, and thus such a control operation as to lower the average brightness level is carried out by using the AE function. Therefore, there occurs such a problem that the overall image is darkened on an output video picture even when the brightness levels of image pickup targets other than the masked private house are not varied.

OBJECT AND SUMMARY OF THE INVENTION

An object of the present invention is to provide an image pickup device which enables the overall output image not to be affected by image information of a mask target area.

In order to attain the above object, according to the present invention, there is provided an image pickup device having a mask function, comprising: mask area setting means for setting a mask area to be masked in a pickup image area; and image processing means for subjecting the image signal of the pickup image area to image processing while removing the mask area set by the mask area setting means from the pickup image area.

According to the image pickup device of the present invention, the mask area setting device sets a specific area in the pickup image as a mask area to keep the area in the output image to be non-displayed. The image processing device removes the image signal of the mask area from the detection target of the image processing to eliminate the effect of the image signal of the mask area on the image processing of the overall image.

Furthermore, when the image processing device is designed to remove the image signal contained in the mask area from the image processing target on the basis of an offset signal to the image signal contained in the mask area, the image processing device gates the image signal corresponding to the detection target on the basis of the offset signal to remove the image signal contained in the mask area from the detection target.

Furthermore, when the image processing is automatic exposure processing, the automatic exposure adjustment can be properly performed with preventing the light amount in the mask area and the variation thereof from adversely affecting the brightness of the overall image, etc.

Still furthermore, when the image processing is automatic white balance processing, the automatic white balance can be properly adjusted with preventing the hue of a subject in the mask area and the variation thereof from adversely affecting the hue of the overall image, etc.

According to the present invention, there is provided an image pickup method for an image pickup device having a mask function, comprising the steps of: setting a mask area to be masked in a pickup image area; and subjecting the image signal of the pickup image area to image processing while removing the mask area thus set from the pickup image area.

In the image processing step, the image signal contained in the mask area can be removed from the image processing target on the basis of an offset signal to the image signal contained in the mask area.

Furthermore, the image processing may be automatic exposure processing and/or automatic white balance processing.

DETAILED DESCRIPTION OF THE PREFERRED EMBODIMENTS

Preferred embodiments according to the present invention will be described with reference to the accompanying drawings. In the following specification and drawings, the constituent elements having substantially the same functional constructions are represented by the same reference numerals, and the duplicative descriptions thereof will be omitted.

First Embodiment

First, a first embodiment according to the present invention will be described. In the following description, a video camera is used as an example of the image pickup device according to the present invention, however, the present invention is not limited to the video camera.

A video camera according to this embodiment is an image pickup device which can pick up still images and/or moving pictures with color, and it is used as a monitoring camera. The video camera has an automatic (auto) exposure (AE) function and an automatic white balance (AWB) function, and it can adjust the exposure and the white balance by amplifying output signals of a CCD solid-state image pickup device (CCD sensor) and then correcting the signal levels thereof, etc. Furthermore, the video camera has a mask function of masking at least a partial area of an overall pickup image so that the masked area is not displayed, that is, the masked area is not viewable by viewers.

The video camera according to this embodiment is characterized in that in order to suitably perform the various functions described above, an effect of image information such as unevenness of color, light amount (brightness), variation of light amount (brightness), etc. in a masked area on an overall pickup image is suppressed to eliminate adverse effects of the mask function on the AE function and the ABW function. The functional construction of the video camera to implement the above characterization will be described hereunder.

First, the overall circuit construction and signal processing of the video camera according to this embodiment will be described with reference to FIG. 1.

Figure 1:
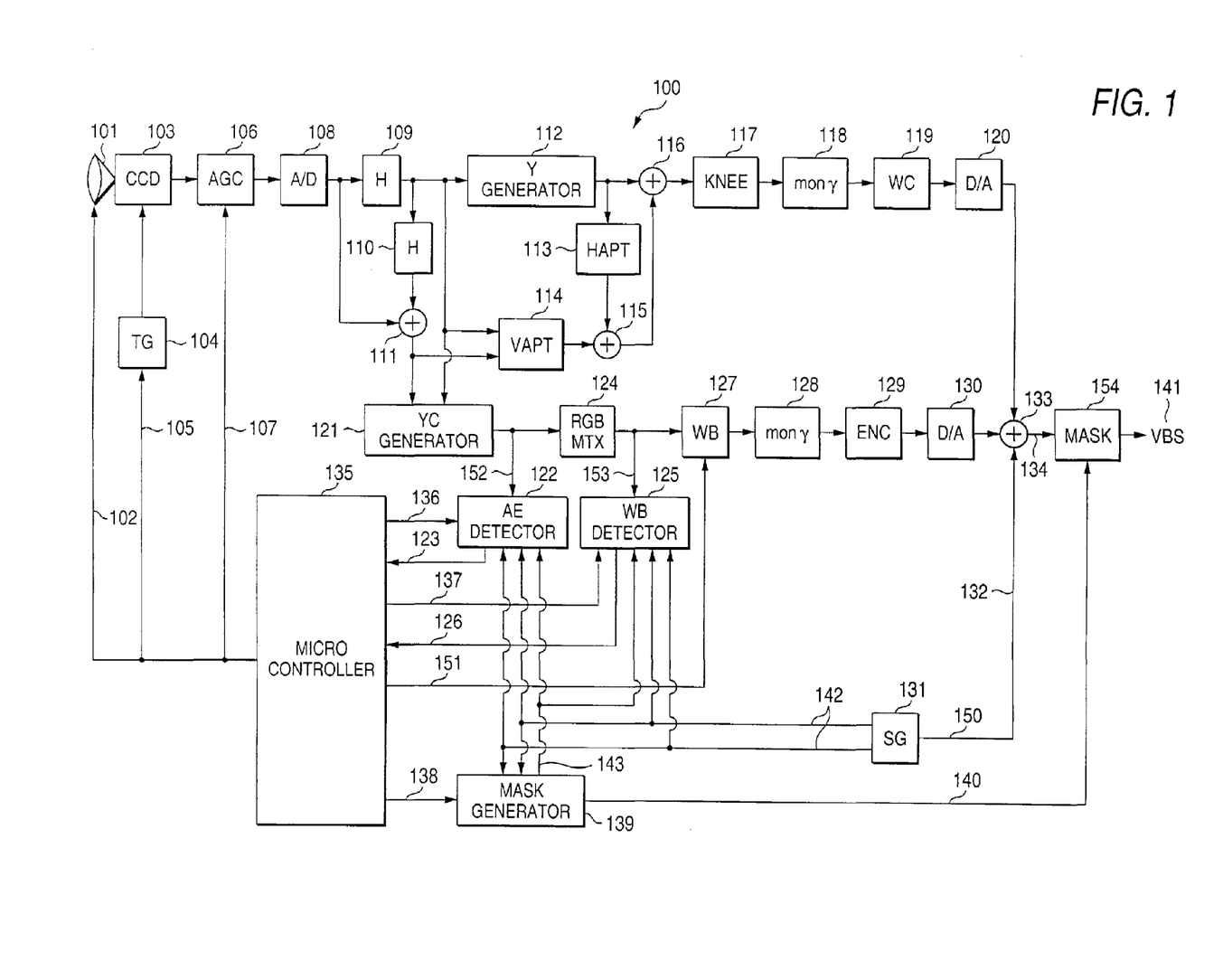
FIG. 1 is a block diagram showing the circuit construction of a video camera according to a first embodiment of the present invention.

FIG. 1 is a block diagram showing the circuit construction of the video camera 100 according to this embodiment. In the following description, the video camera 100 uses a complementary color single-panel CCD as CCD (Charge Coupled Device)(hereinafter merely referred to as CCD) 103, for example. However, the present invention is not limited to this embodiment, and a 3-panel CCD or the like may be used.

As shown in FIG. 1, in the video camera 100, image light from a subject being picked up is incident through an imaging lens 101, and passed through an optical low pass filter (LPF), an infrared-ray cut filter and a color filter (these elements are not shown) to CCD 103. The aperture of the imaging lens 101 can be controlled on the basis of a control signal 102 by a micro-controller (hereinafter referred to as "micon") 135 so as to adjust the light amount of the image light to a standard incident light amount.

CCD 103 is a complementary-color single-panel CCD. An optical image focused by the imaging lens 101 is photoelectrically converted to electrical signals by plural pixels arranged on a photodetection face of the CCD 103, and then the electrical signals thus achieved are output from CCD 103. CCD 103 is driven by a timing generator (hereinafter referred to as "TG") 104, and the image signals corresponding to the electrical signals thus photoelectrically-converted are read out from CCD 103. The shutter speed of TG 104 can be controlled on the basis of a control signal 105 by the micon 135.

The image signals read out from CCD 103 are subjected to, for example, the correlated double sampling processing by a gain control amplifier 106 to be amplified to a suitable level. The gain of AGC 106 can be controlled on the basis of a control signal 107 by the micon 135. The output of AGC 106 is converted from an analog signal to a digital signal by an A/D converter 108.

Each of 1H delay lines 109, 110 is a delay element for delaying NTSC signal or the like by a 1H delay amount, and it can delay the image signal input from the A/D converter 108 by 1 line. The signal delayed by two lines through both the 1H delay lines 109, 110 and the output signal of the A/D converter 108 are added to each other in an adder 111. The delay of the addition signal corresponds to 1-line delay as a group delay, so that this signal is matched in phase with the output signal passed through only the 1H delay line 109.

There will be next described a method in which a Y generating circuit 112 and/or YC generating circuit 121 achieves a brightness signal (Y signal) and/or a color difference signal on the basis of the output signal of the 1H delay line 109 and the output signal of the adder 111.

Figure 2:
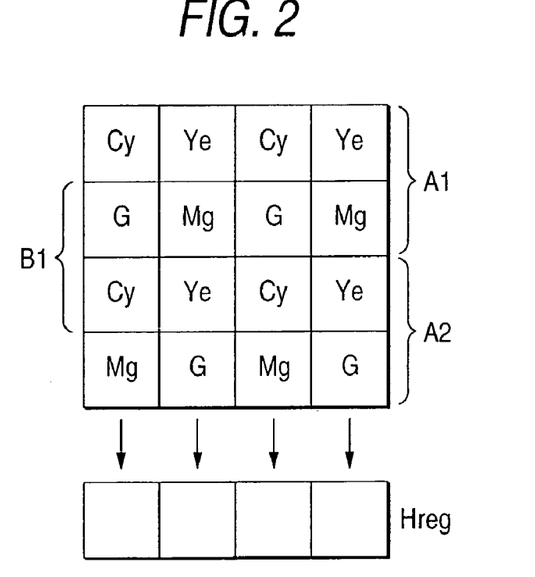
FIG. 2 is a diagram showing an example of the color arrangement of a color filter according to the first embodiment.

For example, a color arrangement as shown in FIG. 2 is applied to the color filter. That is, filters of three complementary colors of yellow (Ye), magenta (Mg) and cyan (Cy) and an elementary color of green (G) are covered on each pixel of CCD 103. When field reading is carried out on the output of CCD 103 through the color filter, charge mixing is carried out on pairs like A1, A2 in A-field and on pairs like B1 in B-field, and the signal of the mixed charges is output through a horizontal shift register Hreg. That is, (G+Cy), (Mg+Ye), (G+Cy) and (Mg+Ye) are output as signals in the A1 line, and (Mg+Cy), (G+Ye), (Mg+Cy) and (G+Ye) are output in the A2 line. Furthermore, (Cy+G), (Ye+Mg), (Cy+G) and (Ye+Mg) are output in the B1 line.

In the Y generating circuit 112, 1-line delayed input signals which are adjacent to each other are added to each other to achieve a Y signal. That is, the following Y signal is used in the A1 line:

$$Y=\{(G+Cy)+(Mg+Ye)\}/2=(2B+3G+2R)/2$$

Furthermore, the following Y signal is used in the A2 line:

$$Y=\{(Mg+Cy)+(G+Ye)\}/2=(2B+3G+2R)/2$$

Here, Cy=G+B, Mg=R+B, Ye=G+R

In the YC generating circuit 121, the Y signal is achieved in the same manner as the Y generating circuit 112, and the color difference signal is achieved by subtracting the neighboring 1-line delayed input signals from each other. That is, the following color difference signal is used in the A1 line:

$$CR=\{(Mg+Ye)-(G+Cy)\}=(2R-G)$$

Furthermore, the following color difference signal is used in the A2 line:

$$-CB=\{(G+Ye)-(Mg+Cy)\}=-(2B-G)$$

Still furthermore, by using the signal generated in the adder 111 in each line, −CB is achieved in the A1 line, and CR is achieved in the A2 line.

Figure 3:
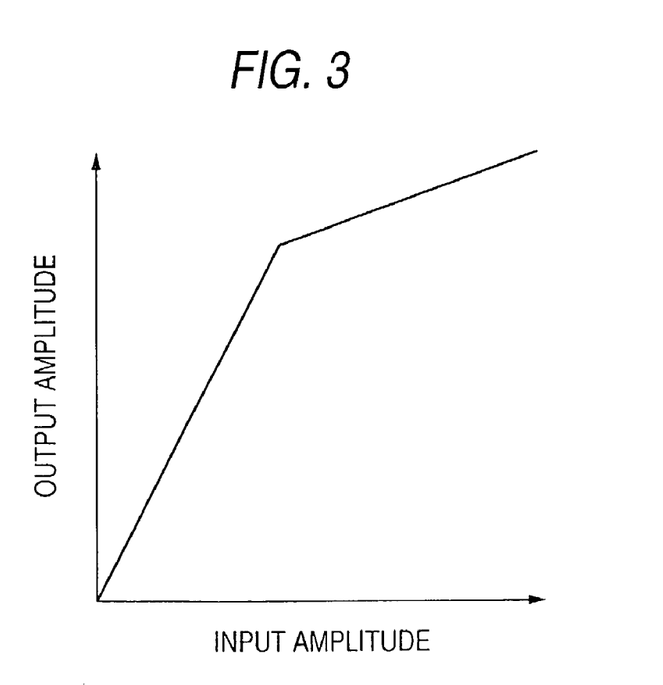
FIG. 3 is a graph showing an adjustment example of a dynamic range based on a knee circuit according to the first embodiment.

The Y signal which is an output of the Y generating circuit 112 is input to a horizontal aperture control generating circuit 113. The horizontal aperture control generating circuit 113 is constructed by a high pass filter in the horizontal direction, and generates a horizontal boost signal. Furthermore, the output of the 1H delay line 109 and the output of the adder 111 are input to a vertical aperture control generating circuit 114. The vertical aperture control generating circuit 114 is constructed by a high pass filter in the vertical direction, and generates a vertical boost signal. The horizontal boost signal and the vertical boost signal are added to each other in an adder 115 after the gains thereof are adjusted (not shown) by the micon 135, and further mixed to the Y signal on the main line in an adder 116. Subsequently, the Y signal thus mixed is input to a knee circuit 117, for example. As shown in FIG. 3, the knee circuit 117 compresses the dynamic range of the output of CCD 103 by adjusting the Y signal such that the amplitude characteristic in the high brightness area of the Y signal is lean. Thereafter, the Y signal is subjected to gamma correction by a correcting circuit 118 for correcting the gamma characteristic of the monitor, then subjected to white clip processing by a white clip circuit 119 and then converted to an analog signal by a D/A converter 120.

The YC signal which is generated from, for example, a complementary color checkered signal by the YC generating circuit 121 is converted to an RGB signal by an RGB matrix circuit 114. The RGB circuit thus achieved is subjected to color temperature adjustment by a white balance circuit (hereinafter referred to as "WB circuit") 127, and then subjected to gamma correction through a correcting circuit 128 for correcting the gamma characteristic of the monitor as in the case of the Y signal. Thereafter, the RGB signal thus gamma-corrected is modulated with a sub-carrier signal (not shown) by an encoder circuit 129 and then converted to an analog signal by a D/A converter 130 so as to conform with the signal standard such as, for example, NTSC, PAL and SECAM.

The Y signal and the color difference signal which are converted to the analog signals as described above are mixed with an SYNC signal (synchronous signal) 150 generated by a synchronous signal generating circuit (hereinafter referred to as "SG circuit") 131, thereby achieving a VBS signal (which is also called as a composite signal) 134 corresponding to a television signal, for example.

Figure 4:
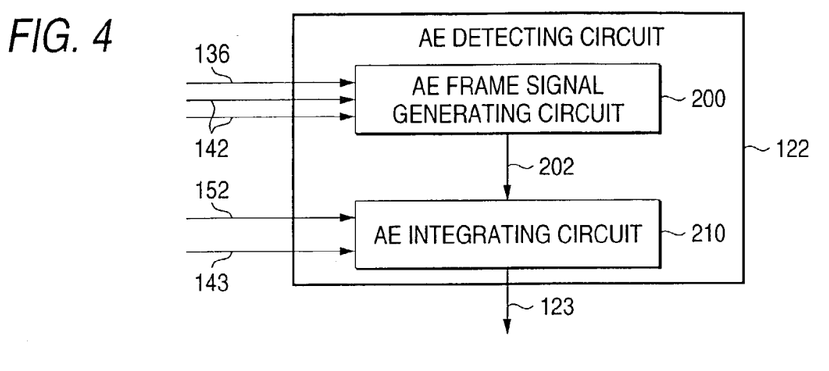
FIG. 4 is a block diagram showing the construction of an AE detecting circuit according to the first embodiment.

The output signal 152 of the YC generating circuit 121 is also input to the AE detecting circuit 122. The AE detecting circuit 122 comprises an AE frame signal generating circuit 200 for generating a detection frame for automatic exposure (hereinafter referred to as "AE detection frame") and an AE integrating circuit 210 for integrating a brightness signal within the AE detection frame as shown in FIG. 4.

The AE frame signal generating circuit 200 generates an AE detection frame by using an AE detection frame setting signal 136 from the micon 135 and image position information 142 from the SG circuit 131, and outputting an AE frame signal 202 indicating the AE detection frame to the AE integrating circuit 210. Furthermore, the AE integrating circuit 210 integrates the output signal 152 from the YC generating circuit 121, for example by one field, within an area achieved by removing the mask frame described later from the AE detection frame, and outputs the detection signal 123 corresponding to the integration result to the micon 135. The details of the detecting operation of the AE detecting circuit 122 as described above will be described later.

On the basis of the detection signal 123 from the AE detecting circuit 122, the micon 135 adjusts the exposure by using the control signals 102, 105 and 107 so as to keep the target AE level. For example, under the normal image pickup state, the micon 135 monitors the AE level of a pickup image by using the detection signal 123 from the AE detecting circuit 122. If it is judged as a result of the monitoring result that the AE level thus monitored is brighter than the target AE level, the micon 135 carries out various control operations of narrowing down the aperture of the image pickup lens 101 by using the control signal 102, actuating the electronic shutter through TG 104 by using the control signal 105 to reduce the exposure amount of CCD 103, suppress amplification of the AG amplifier 106 by using the control signal 107, etc.

As described above, the AE detecting circuit 122 and the micon 135 function as an image processing device for performing the automatic exposure processing according to this embodiment.

Figure 5:
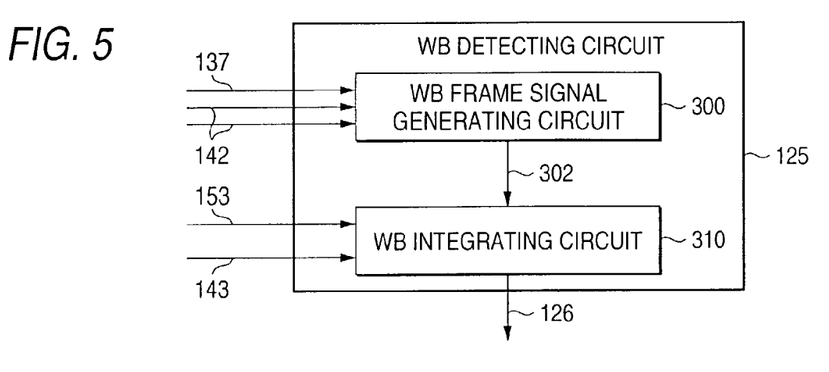
FIG. 5 is a block diagram showing the construction of a WB detecting circuit according to the first embodiment.

An RGB signal 153 corresponding to the output of an RGB matrix circuit 124 is also input to a WB detecting circuit 125. As shown in FIG. 5, the WB detecting circuit 125 comprises a WE frame signal generating circuit 300 for generating a detection frame for white balance (hereinafter referred to as "WB detection frame"), and a WB integrating circuit 310 for integrating the RGB signal 153 within the WB detection frame.

The WB frame signal generating circuit 300 generates the WB detection frame by using a WB detection frame setting signal 137 from the micon 135 and the image position information 142 from the SG circuit 131, and outputs a WB frame signal 302 indicating the WB detection frame to the WB integrating circuit 310. Furthermore, the WB integrating circuit 310 integrates the RGB signal 153, for example by one field, within an area achieved by removing the mask frame described later from the WB detection frame, and outputs the integration result 126 to the micon 135.

On the basis of the integration result 126, the micon 135 calculates the gain balance of the RGB signal for adjusting the color temperature, and controls the gain of the amplifier (not shown) of the WB circuit 127, whereby the white balance of the output image can be automatically adjusted in accordance with the color temperature of the light source, for example.

As described above, the WB detecting circuit 125, the WB circuit 127 and the micon 135 function as the image processing device for carrying out the automatic white balance processing according to this embodiment.

A mask generating circuit 139 generates a mask signal 140 representing a mask frame by using a mask frame setting signal 138 input from the micon 135 for setting the mask frame and the image position information 142 input from the SG circuit 131. On the basis of the mask signal 140, the mask circuit 154 masks a mask target area (in the following description, it may be referred to as a mask area) within the mask frame of the VBS signal 134 achieved by an adder 133, and achieves a final output 141. Accordingly, an output image, for example, a part of the output image is masked (for example, filled with black or the like) and hidden, so that privacy protection can be performed, for example. The mask area is not limited to one place, and the mask generating circuit 139 may generate plural mask signals 140 in accordance with required mask areas.

As described above, the mask generating circuit 139 and the micon 135 can function as a mask target area specifying device, and specify the mask target area.

Furthermore, the mask generating circuit 139 is designed to input a mask signal 143 serving as an offset signal to the AE detecting circuit 122 and the WB detecting circuit 125 (indicated by a heavy line in FIG. 1). The mask signal 140 and the mask signal 143 are made different only in phase in accordance with the delay of the image signal to be applied.

Transmission of the mask signal 143 to the AE detecting circuit 122 and the WB detecting circuit 125 is not carried out in the conventional video camera, and this feature is one of main features of the video camera 100 according to this embodiment. In connection with this feature, the micon 135 of this embodiment is further equipped with a control program for determining the image average brightness and the WB gain in accordance with the mask area in addition to the conventional control program.

The overall circuit construction and signal processing of the video camera 100 according to this embodiment has been described above.

Next, the detection of the AE detecting circuit 122 which is a feature of this embodiment will be described in detail.

Figure 6:
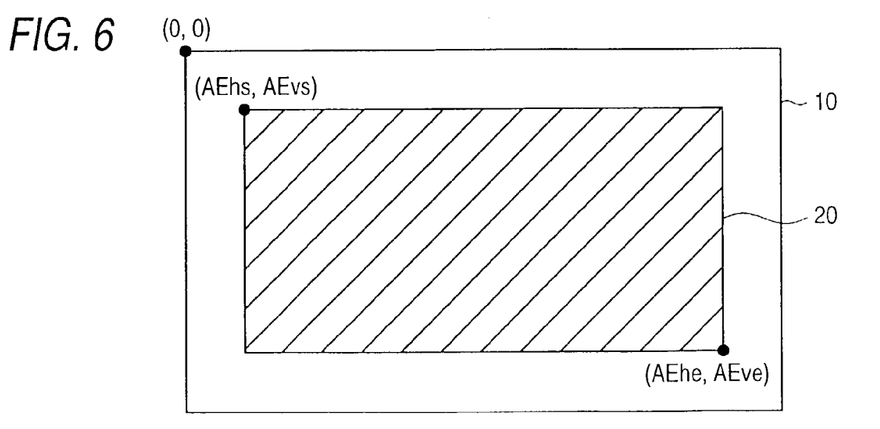
FIG. 6 is a diagram showing an example of an AE detection frame set on an image.

First, a setting example of the AE detection frame will be described with reference to FIG. 6. FIG. 6 shows an example of the AE detection frame 20 set on an image.

The image position information 135 from the SG circuit 131 represents the horizontal and vertical positions on the image independently of each other, and defines them as hadr, vadr respectively. Here, hadr is reset every horizontal retrace period (HD), and vadr is reset every vertical retrace period (VD). Accordingly, any pixel in one field can be represented by two-dimensional coordinates using hadr, vadr. For example, the pixel at the horizontal position hpos and the vertical position vpos is represented by a two-dimensional coordinate (hpos, vpos).

As shown in FIG. 6, the AE detection frame 20 set by the micon 135 is disposed inside the overall image 10 of one filed. Specifically, the AE detection frame 20 is a frame which can be set by giving two coordinates (AEhs, AEvs), (AEhe, AEve) represented by hadr, vadr as described above. The image in an area (a hatched area) surrounded by the AE detection frame 20 is a detection target of AE detection.

Figure 7:
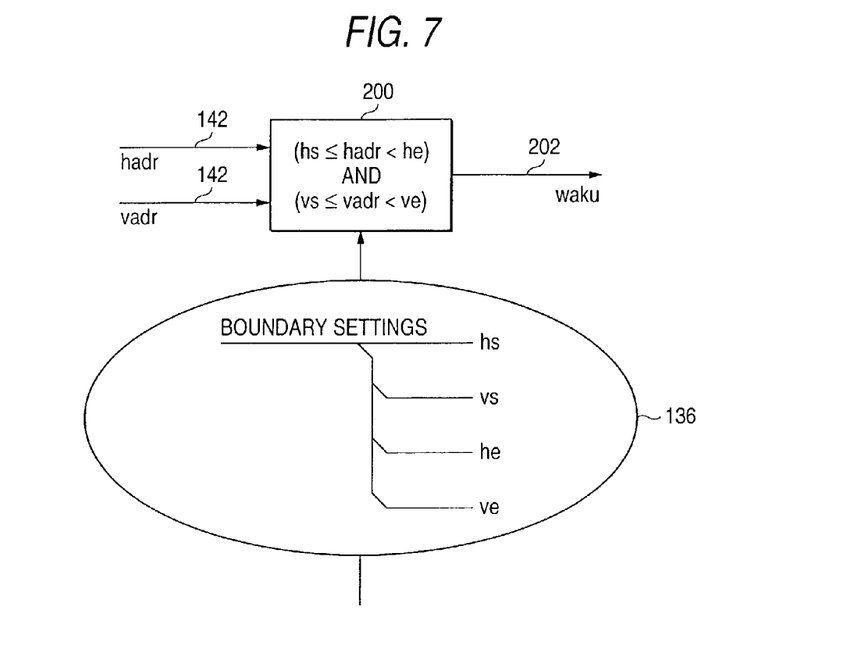
FIG. 7 is a block diagram showing the construction of an AE frame signal generating circuit according to the first embodiment.

Next, the AE frame signal generating circuit for generating the AE detection frame will be described in detail with reference to FIG. 7. FIG. 7 is a block diagram showing the construction of an AE frame signal generating circuit 200.

As shown in FIG. 7, the image position information (hadr and vadr) 142 generated by the SG circuit 131 is input to the AE frame signal generating circuit 200, and also the AE detection frame setting signal 136 is input from the micon 135 to the AE frame signal generating circuit 200.

The AE detection frame setting signal 136 is a signal representing a boundary condition of the AE detection frame 20, and it specifically contains a horizontal-direction detection frame start position hs, a vertical-direction detection start position vs, a horizontal-direction detection frame end position he and a vertical-direction detection frame end position ve, for example. The AE frame signal generating circuit 200 has a comparator, and generates an AE frame signal (waku) 202 from the image position information 142 on the basis of the these AE detection frame setting signal 136. Specifically, a signal in which an area that satisfies the condition of hs≦hadr<he and hs≦vadr<he is set to "1" and an area that does not satisfy the above condition is set to "0" is output.

The WB frame signal generating circuit 300 and the mask generating circuit 139 also generate the WB frame signal 302 and the mask signal 143 by the same circuit as the AE frame signal generating circuit 200 as described above to achieve the WB detection frame and the mask frame, however, the description thereof is omitted.

Next, a method of detecting a predetermined area by the AE detecting circuit 122 on the basis of the AE detection frame 20 as described above by using the AE integrating circuit 210 will be described in detail. In the following description, a method of detecting the overall area within the AE detection frame 20 will be first described in order to clarify the feature of this embodiment through the comparison, and then a method of detecting an area achieved by removing a mask area from the area within the AE detection frame 20 according to this embodiment will be described.

(Method of Detecting Overall Area within AE Detection Frame)

First, the method in which the whole area within the AE detection frame 20 as shown in FIG. 20 is set as a detection target will be described. According to this method, the detection target area is determined on the basis of only the AE detection frame 20 irrespective of the presence or absence of a mask frame. Accordingly, it is assumed that the mask signal 143 generated by the mask generating circuit 139 is not input to the AE detecting circuit 122 (that is, there is no signal flow indicated by the heavy line of FIG. 1).

Figure 8:
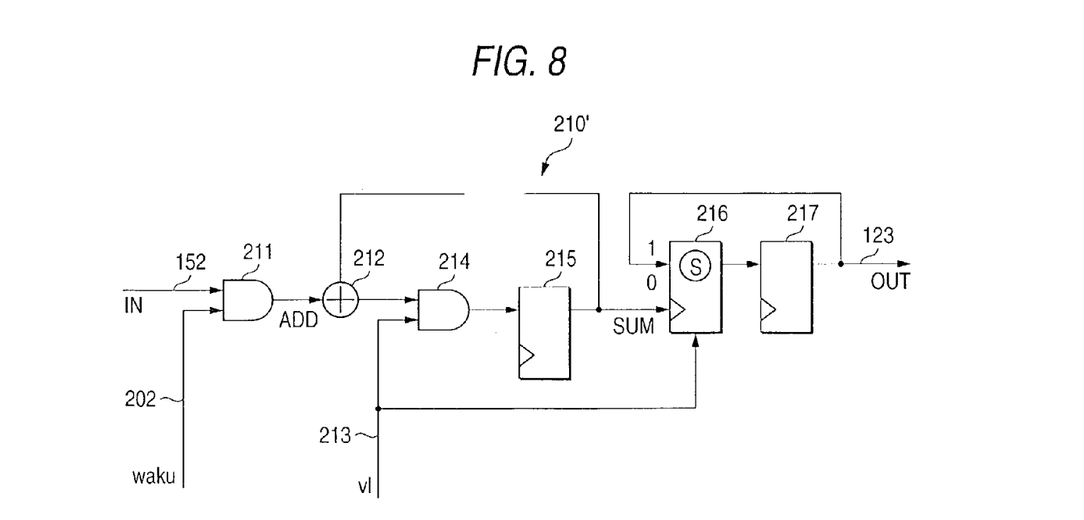
FIG. 8 is a block diagram showing the construction of a comparing AE integrating circuit for detecting the entire area in the AE detection frame.

First, a comparing AE integrating circuit for detecting the whole area within the AE detection frame 20 will be described in detail with reference to FIG. 8. FIG. 8 is a block diagram showing the construction of a comparing AE integrating circuit 210' for detecting the whole area within the AE detection frame 20 (hereinafter merely referred to as AE integrating circuit 210' in some cases).

As shown in FIG. 8, an input brightness signal (in) 152 is first subjected to gating on the basis of the AE frame signal (waku) 202 input from the AE frame signal generating circuit 200 in an AND gate 211. That is, only the signal within the AE detection frame 20 is output with keeping its signal level, and the signal out of the AE detection frame 20 is output while its signal level is replaced by the signal level "0" (add signal) so that the signal has no effect on the integration result. Furthermore, an adder 212 repetitively adds a just-before addition result corresponding to the output of a flip flop circuit 125 with the current data (newly input add signal) (that is, integrates the add signal) to achieve an integration result sum. A reset signal (vl) 213 which gives "0" pulses of one clock for example, once for example, every field for example, is input from the SG circuit 131 to the AND gate 214. Therefore, the integration result sum is reset once every field by the AND gate 214, for example.

Furthermore, the reset signal 213 is also input to a selector 216. Therefore, the integration result sum is input from the selector 216 to the flip flop circuit 217 during only the period when the reset signal 213 is set to "0", for example. On the other hand, during the other period, the output of the flip flop circuit 217 is input to the flip flop circuit 217 itself, so that the data can be held during one-field period. Accordingly, the value of the detection result (out) 123 is renewed every one field, for example, and the micon 135 takes in the detection result 123 while avoiding the above renewal timing.

Figure 9:
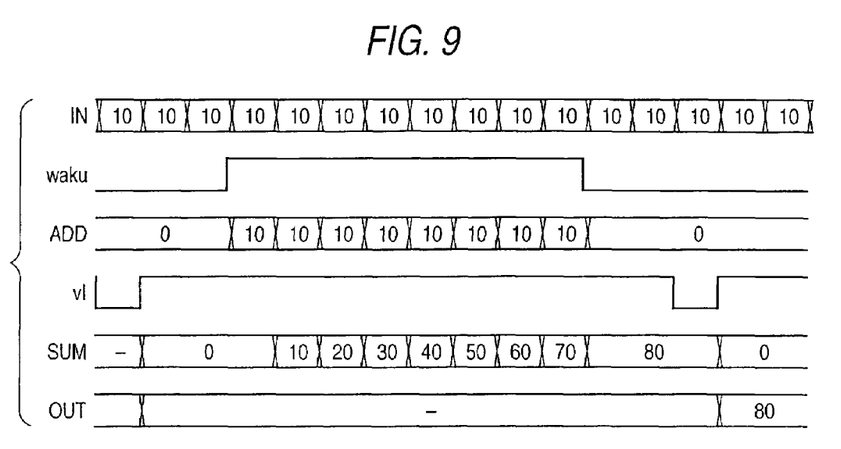
FIG. 9 is a timing chart showing an operation example of the AE integrating circuit for detecting the entire area in the AE detection frame.

Next, the operation example of the AE integrating circuit 210' for detecting the whole area within the AE detection frame 20 will be described with reference to FIG. 9. FIG. 9 is a timing chart showing the operation example of the AE integrating circuit 210' for detecting the whole area within the AE detection frame 20.

As shown in FIG. 9, in order to simplify the description, it is assumed that a signal having a fixed level, for example, a level of "10" is input as the brightness signal (in) 152 and also a signal indicating that eight pixels are located in the AE detection frame 20 is input as the AE frame signal (waku) 202. The AE frame signal 202 indicates that when the signal level is equal to "1", the pixel thereof is located within the AE detection frame 20 and when the signal level is equal to "0", the pixel thereof is located out of the AE detection frame 20. Furthermore, the reset signal (vl) 213 applied to the AND gate 214 is set so that the start portion of a field which corresponds to, for example, one clock, is set to "0", and at this time point, the flip flop circuit 215 is assumed to be initialized to "0".

The brightness signal (in) 152 is supplied to the adder 212 (add signal) by the AND gate 211 while the signal level thereof is kept to the original level "10" during the period when the AE frame signal (waku) 202 is set to "1" or the signal level thereof is replaced by "0" during the other period. Therefore, in the adder 212, addition (integration) of the signal level "10" is successively carried out at the frequency corresponding to the eight pixels for which the AE frame signal 202 is set to "1". In this case, as described above, it is assumed that eight pixels are located within the AE detection frame 20, and thus the signal level of the brightness signal (in) 152 passed through the AND gate 211 for the eight pixels concerned is kept to "10" (original level) because the AE frame signal 202 (waku) for the eight pixels concerned is set to "1". Accordingly, the integration result sum output from the adder 212 at the time point when the AE frame signal 202 is returned from "1" to "0" (i.e., the sum of the signal levels of the brightness signals (in) 152 of the eight pixels is equal to "80". The integration result sum is supplied to the flip flop circuit 217 at the time when the reset signal 213 is set to "0" again. Accordingly, the detection result (out) 123 is renewed to "80" and held during one field period "80".

Furthermore, the micon 135 takes in the detection result (out) 123 every field, calculates the average brightness level of each pixel by the following equation, compares the calculation result with a target value and determines an image pickup condition. In the following equation, the detection result 123 is represented by I.

(Average Brightness Level)=(Integration Value of Area within AE detection frame)/(Number of Pixels within AE detection frame)=$I/(AEhe-AEhs)*(AEve-AEvs)$ In the above case, the detection result 123 of the "8" pixels is equal to "80", so that the average brightness level is equal to 80/8="10". If this value is different from a desired brightness level, the micon 135 controls the aperture of the imaging lens 101, the electronic shutter, the amplification gain of AGC 106, etc. to achieve a target brightness level.

However, according to the method of detecting the whole area within the AE detection frame 20 as described above, when a mask frame (not shown) is set by the mask generating circuit 139, the area within the mask frame is also detected. Therefore, the detection result 123 contains the brightness information of the inside of the mask area, and thus the overall image is affected by the brightness level, the brightness variation, etc. in the mask area, so that there may occurs a case where the output brightness level cannot be properly controlled.

(Method of Detecting Area Achieved by Removing Mask Area From Inside Area of AE Detection Frame)

Next, a method of detecting an area achieved by removing a mask area from the inside area of the AE detection frame 20 will be described.

Figure 10:
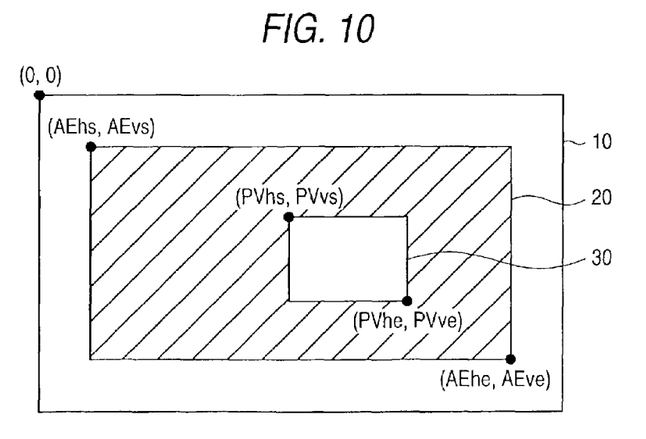
FIG. 10 is a diagram showing an example of an AE detection frame and a mask frame set on an image.

First, settings examples of the AE detection frame and the mask frame will be described with reference to FIG. 10. FIG. 10 is a diagram showing examples of the AE detection frame 20 and the mask frame 30 set on an image.

As shown in FIG. 10, in this setting example, a mask frame 30 is further set, for example, within the AE detection frame 20 as shown in FIG. 6. The inside area of the mask frame 30, that is, the area specified by (PVhs, PVvs), (PVhe, PVve) is a mask area. In the following description, a method of detecting an area (a hatched area of FIG. 10) achieved by removing the mask area from the detection target area specified by the AE detection frame 20 will be described.

Figure 11:
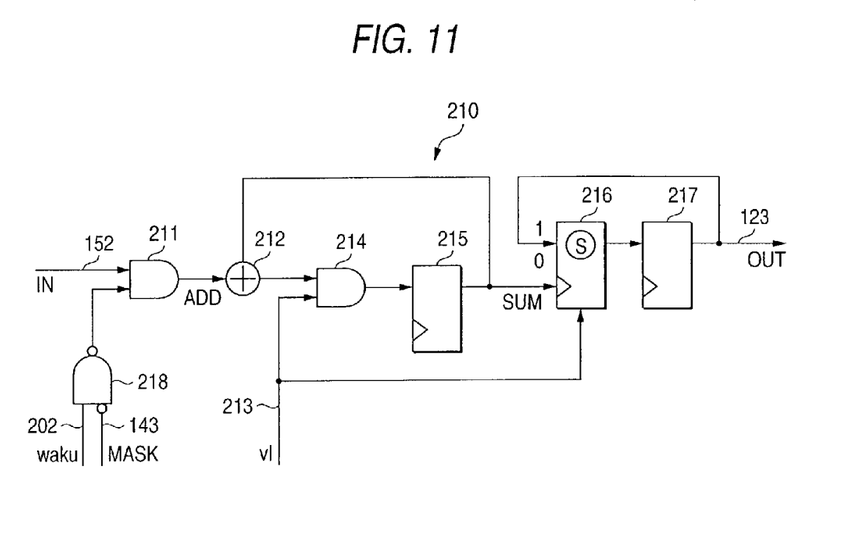
FIG. 11 is a block diagram showing the construction of the AE integrating circuit according to the first embodiment.

The AE integrating circuit 210 according to this embodiment which detects the area achieved by removing the mask area from the inside area of the AE detection frame will be described in detail with reference to FIG. 11. FIG. 11 is a block diagram showing the construction of the AE integrating circuit 210 according to this embodiment.

As shown in FIG. 11, in comparison with the comparing AE integrating circuit 210' shown in FIG. 8, the AE integrating circuit 210 of this embodiment is added with a mask signal (mask) 143 and an AND gate 218, for example. More specifically, the mask signal 143 from the mask generating circuit 139 is input as an inversion signal to the AND gate 218 of the AE integrating circuit 210, whereby the AND gate 218 gates the AE frame signal (waku) 202 by the inversion signal of the mask signal 143. With this construction, only the area achieved by removing the mask area from the inside area of the AE detection frame 20 can be detected while eliminating the mask area from the detection target area. At this time, the mask signal 143 functions as an offset signal to the image signal contained in the mask area. The construction of the portion other than the above portion is substantially the same as the construction of the comparing AE integrating circuit 210' shown in FIG. 8, and thus the description thereof is omitted.

Figure 12:
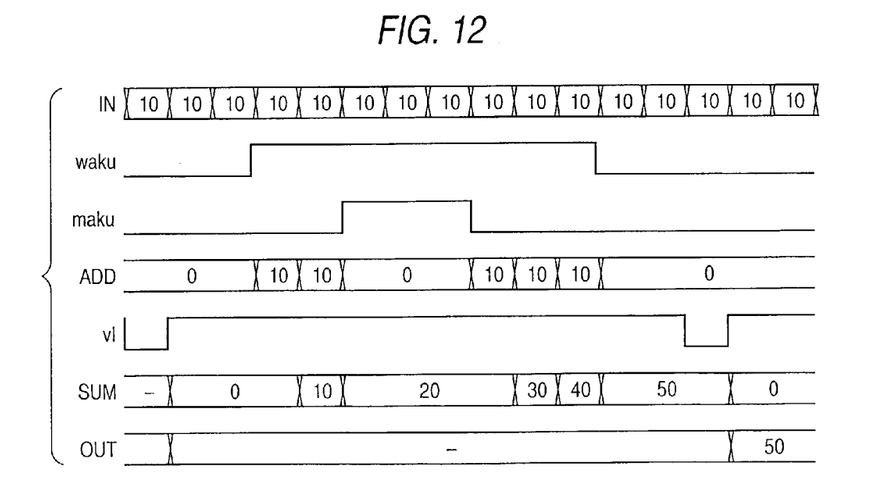
FIG. 12 is a timing chart showing an operation example of the AE integrating circuit according to the first embodiment.

Next, the operation example of the AE integrating circuit 210 will be described with reference to FIG. 12. FIG. 12 is a timing chart showing the operation of the AE integrating circuit 210 according to this embodiment.

As shown in FIG. 12, the input condition for the brightness signal (in) 152, the AE frame signal (waku) 202 and the reset signal (vl) 213 and the initial condition for the flip flop circuit 215 are substantially the same as the operation of the comparing AE integrating circuit 210' shown in FIG. 9, and the description thereof is omitted. In addition to these signals, the mask signal (mask) 143 is newly input to the AE integrating circuit 210. The mask signal 143 represents that three pixels (for example, third to fifth pixels) in the eight pixels for which the AE frame signal 202 is within the AE detection frame 20 are located within the mask frame 30. The mask signal 143 represents that when the signal level is equal to "1", the pixel thereof is located within the mask frame 30, and when the signal level is equal to "0", the pixel thereof is located out of the mask frame 30.

The brightness signal (in) 152 is supplied through the AND gate 211 to the adder 212 (add signal) while the original signal level "10" thereof is kept during the period when the AE frame signal (waku) 202 is equal to "1" and the mask signal (mask) 143 is equal to "0" and the signal level is replaced by the signal level "0" during the other period. In this case, this embodiment is characterized that the signal level of the add signal is equal to "0" during the period when the mask signal 143 is equal to "1" even when the AE frame signal 202 is equal to "1". Accordingly, in the adder 212, the signal levels "10" of, for example, five pixels which are located within the AE detection frame 20 and out of the mask frame 30 are added to one another, and at the time point when the AE frame signal 202 is returned to "0", the integration result sum is equal to "50". The integration result sum is given to the flip flop circuit 217 at the time point when the reset signal 213 is equal to "0" again. Accordingly, the detection result (out) 123 is renewed to "50", and held during one-field period "50".

The micon 135 takes in the detection result (out) 123 every field, calculates the average brightness level per pixel by the following equation, and compares the calculation result with a target value to determine the image pickup condition. In the following equation, the detection result 123 is represented by I.

(average brightness level)=(integration value of area within *AE* detection frame and out of mask frame)/(Number of pixels within *AE* detection frame and out of mask frame)=$I/\{(AEhe-AEhs)*(AEve-AEvs)-(PVhe-PVhs)*(PVve-PVvs)\}$ For example, in the above example, since the detection result 123 for (8−3)="5" pixels is equal to "50", the average brightness level is set to 50/5="10". When the average brightness level is different from a desired brightness level, the micon 135 controls the aperture of the imaging lens 101, the electronic shutter, the amplification gain of AGC 106, etc. to achieve a target brightness level.

As described above, the mask area is excluded from the AE detection targets in the AE detecting circuit 122 of this embodiment, so that the brightness, the brightness variation, etc. of the mask area do not affect the AE detection result and the AE control is performed on the basis of only the image signal displayed. Therefore, a suitable imaging state can be kept.

Furthermore, in the case of the WB detecting circuit 125, the circuit and the operation are substantially the same as the AE detecting circuit 122 except that only the input signals such as the WB detection frame setting signal 137, the RGB signal 153, etc. are different, and thus the detailed description thereof is omitted. In the WB detecting circuit 125 as described above, the mask area can be excluded from the WB detection targets. Accordingly, the brightness, color deviation, etc. of the mask area do not affect the WB detection result, and thus the white balance can be suitably adjusted.

Figure 13:
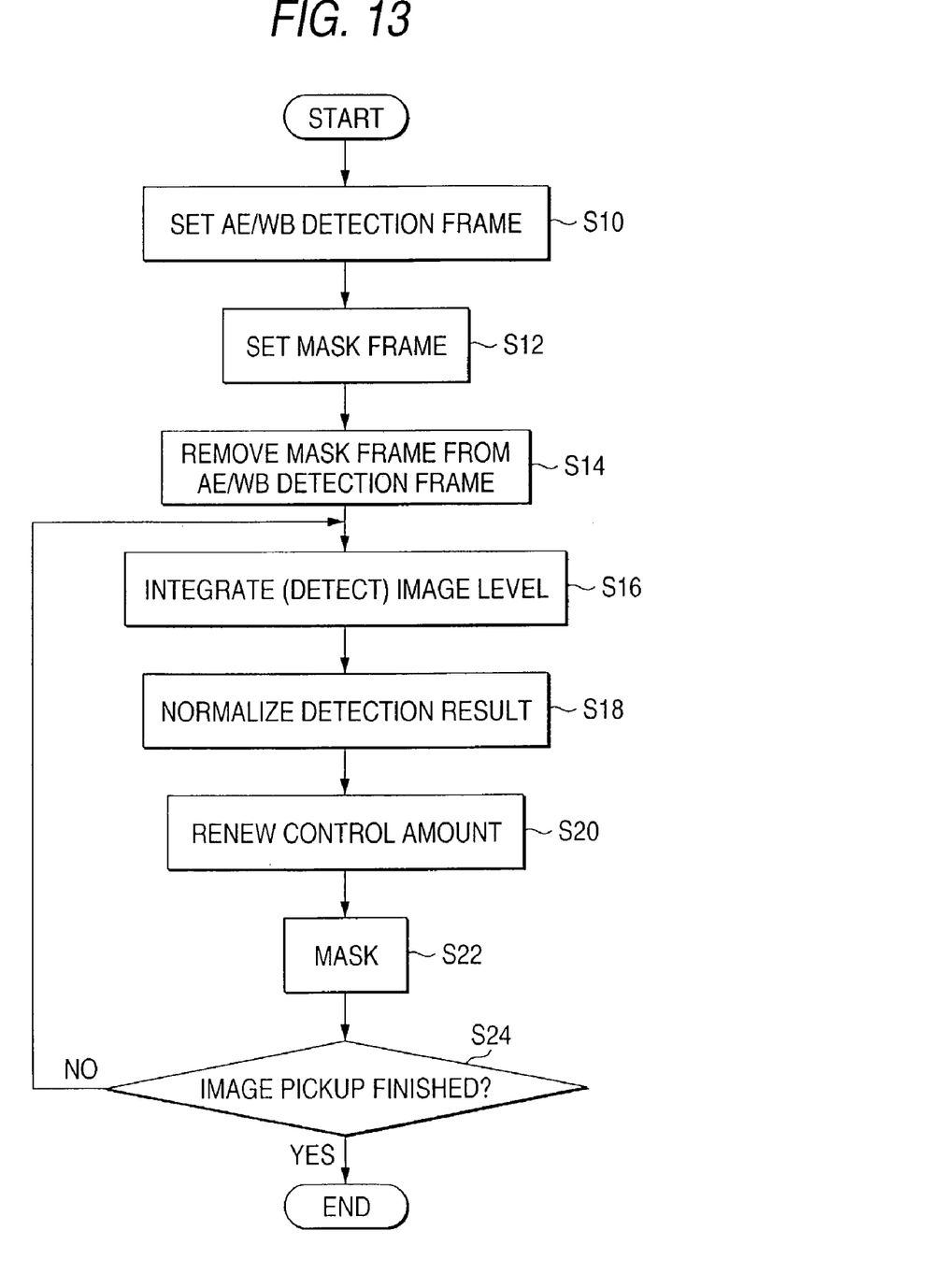
FIG. 13 is a flowchart showing the overall operation flow of AE processing, AWB processing and mask processing according to the first embodiment.

Next, the overall operation flow of the AE processing, the AWB processing and the mask processing according to this embodiment will be described with reference to FIG. 13. FIG. 13 is a flowchart showing the overall operation flow of the AE processing, the AWB processing and the mask processing according to this embodiment. In the following description, the video camera 100 carries out both the AE processing and the AWB processing. However, the present invention is not limited to this embodiment, and the video camera 100 may be designed to carry out any one of the AE processing and the AWB processing, or may be designed to carry out other image processing.

As shown in FIG. 13, the AE detection frame 20 and the WB detection frame are first set in step S10. The AE frame signal generating circuit 200 of the AE detecting circuit 122 generates the AE frame signal 202 representing the AE detection frame 20 on the basis of the AE detection frame setting signal 136 from the micon 135 and the image position information 142 from the SG circuit 131. The WB frame signal generating circuit 300 of the WB detecting circuit 125 generates the WB frame signal 302 representing the WB detection frame on the basis of the WB detection frame setting signal 137 from the micon 135 and the image position information 142 from the SG circuit 131.

Subsequently, the mask frame 30 is set in step S12. The micon 135 sets the mask frame 30 on the basis of information representing a mask area which is manually input, or on the basis of preset information, and outputs the mask frame setting signal 138 to the mask generating circuit 139. The mask generating circuit 139 generates the mask signals 140, 143 representing the mask frame 30 on the basis of the mask frame setting signal 138 and the image position information 142 from the SG circuit 131 The step S12 corresponds to the mask target area specifying step according to this embodiment.

In step S14, the mask frame is removed from the AE detection frame 20 and the WB detection frame. In the AE integrating circuit 210, the AE frame signal 302 is gated by the mask signal 143 from the mask generating circuit 139, whereby the detection target area is reset to an area achieved by removing the mask area from the inside area of the AE detection frame 20 (the area thus achieved will be referred to as a reset AE detection target area). Likewise, in the WB integrating circuit 310, the detection target area is reset to the area achieved by removing the mask area from the inside area of the WB detection frame (the area thus achieved will be referred to as reset WB detection target area).

Thereafter, the image signal is integrated in step S16. The brightness signal 152 is input from the YC generating circuit 121 to the AE integrating circuit 210. The AE integrating circuit 210 integrates the signal level of the brightness signal 152 within the reset AE detection target area over one field to perform the AE detection. Furthermore, the RGB signal 153 is input from the RGB matrix circuit 114 to the WB integrating circuit 310. The WB integrating circuit 310 integrates the signal level of the RGB signal 153 within the reset WB detection target area for each of the R signal, the G signal and the B signal, thereby performing the WB detection.

Subsequently, the detection result is normalized in step S18. The micon 135 divides the one-field integration value corresponding to the detection result of the AE detecting circuit 122 by the number of detected pixels to normalize the detection result and calculate the average brightness level. The number of the detected pixels as described above is defined as a value determined by subtracting the number of the pixels of the mask area superposed on the AE detection frame 20 from the number of the pixels of the inside area of the AE detection frame 20. The micon 135 calculates, for example, the ratio in signal level of the R signal, the G signal and the B signal from the one-field integration value corresponding to the detection result of the WB detecting circuit 125.

In step S20, the control amounts of the AE and AWB adjustment are renewed. The micon 135 compares the calculated average brightness level with a target value and the control amount of each of the devices such as the lens 101, etc. is renewed so as to achieve proper exposure, thereby performing the AE adjustment. The micon 135 renews the control amount for the WE circuit 127 on the basis of the calculated signal level ratio of the R signal, the G signal and the B signal, for example, whereby the gain of each signal of the amplifier in the WB circuit 127 is increased/reduced to thereby automatically adjust the white balance. The steps S14 to S20 correspond to the image processing process according to this embodiment.

Thereafter, in step S22, the inside of the mask frame 30 is masked. The image signal which has been subjected to the AE and AWB adjustment in the above steps is input to the mask circuit 154. The mask circuit 154 masks the mask area on the basis of the mask signal 140 from the mask generating circuit 139. That is, the mask circuit 154 replaces the signal level of the image information of the mask area with the mask level, so that the output image is made invisible by filling the output image with black or the like.

Subsequently, it is judged in step S24 whether the image pickup operation of the vide camera 100 is finished or the like. When the image pickup operation is continued, the processing returns to the step S16 to detect the image signal of a next field. During this period, the mask area of the output image is still kept masked at all times, for example.

As described above, the video camera 100 having the mask function according to this embodiment removes the mask area from the AE/WB detection target area, and thus the image information of the mask area is prevented from affecting the image adjustment of the non-masked area, so that the image processing such as the AE processing, the AWB processing, etc. can be suitably performed.

Second Embodiment

Next, a second embodiment according to the present invention will be described.

Figure 14:
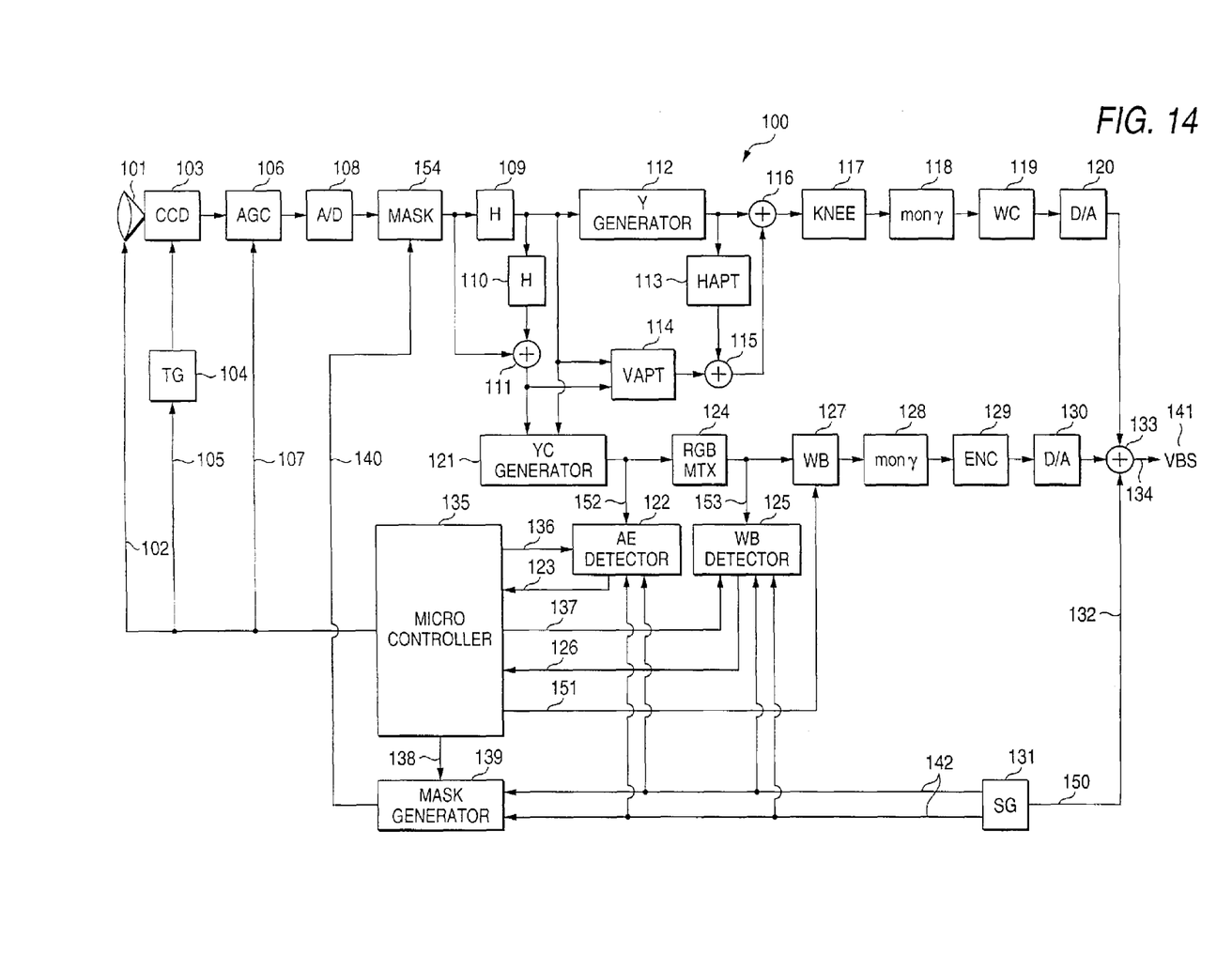
FIG. 14 is a block diagram showing the circuit construction of a video camera according to a second embodiment.

The video camera 100 according to the second embodiment has substantially the same construction as the video camera 100 of the first embodiment except that the arrangement of the mask circuit 154 is different and the mask generating circuit 139 outputs no mask signal 143 to the AE detecting circuit 122 and the WB detecting circuit 125. Therefore, the description on the same construction will be omitted from the following description.

First, the circuit construction and the signal processing of the video camera 100 according to this embodiment will be described with reference to FIG. 14. FIG. 14 is a block diagram showing the circuit construction of the video camera 100 according to this embodiment.

As shown in FIG. 14, the mask circuit 154 is disposed just after the A/D converter 108 in the video camera according to this embodiment. As described above, this embodiment is characterized in that the mask circuit 154 which generally equipped at a position near to the output side of the image signal is disposed at a position near to the input side of the image signal. Furthermore, the mask generating circuit 139 outputs the mask signal 140 to the only the mask circuit 154, and outputs the mask signal 140 to neither the AE detection circuit 122 nor the WB detecting circuit 125.

When an image signal which is converted to a digital signal by the A/D converter 108 is input to the mask circuit 154, the mask circuit 154 masks the mask area on the basis of the mask signal 140. That is, the mask circuit 154 carries out the processing of replacing the signal level of the image signal in the mask area with the mask level (for example, the black level "0").

The image signal thus masked by the mask circuit 154 is output to the 1H delay lines 109, 110, and subjected to substantially the same processing as the first embodiment except for the detection of the AE detecting circuit 122 and the WB detecting circuit 125. As a result, the mask area in the VBS signal 141 corresponding to the final output is masked.

With this construction, the image signal can be subjected to gating in advance before it is subjected to AE or WB detection by applying the mask signal 140 from the mask generating circuit 139 to the image signal itself after the A/D conversion. That is, all the image signal in the mask area is removed at the time point when the image signal is input to the AE detecting circuit 122 and the WB detecting circuit 125. Therefore, it is unnecessary to subject the AE detection frame 20 and the WB detection frame to the gating with the mask frame 30 unlike the first embodiment. That is, even when no mask signal 143 is input, the AE detecting circuit 122 and the WB detecting circuit 125 can suitably perform the AE and WB detection without being affected by the image information of the mask area by detecting the inside area of the AE detection frame 20 and the WB detection frame which is set by the micon 135. Furthermore, with this construction, the circuit scale of the video camera 100 can be reduced.

Figure 15:
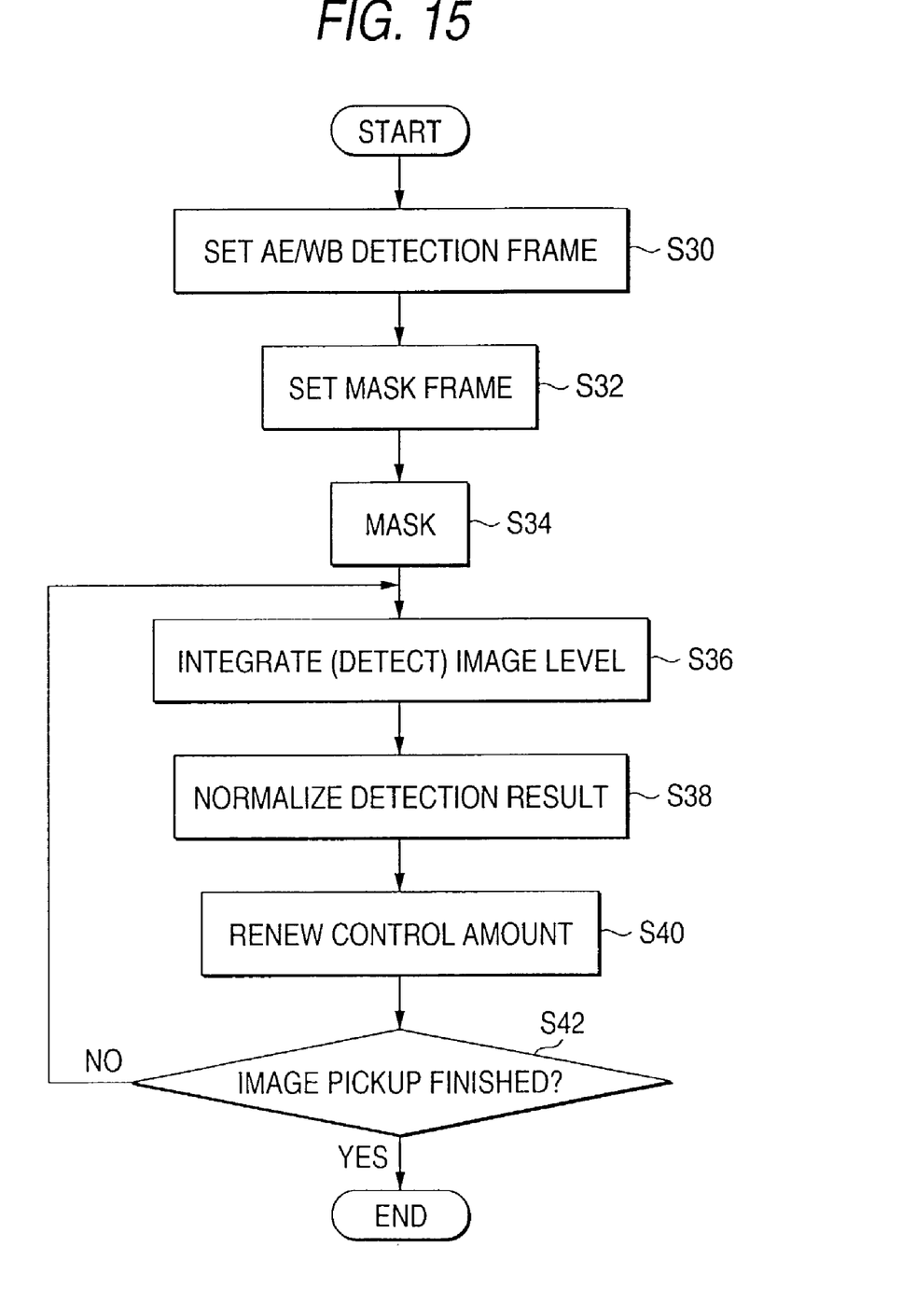
FIG. 15 is a flowchart showing the entire operation flow of AE processing, AWB processing and mask processing according to the second embodiment.

Next, the overall operation flow of the AE processing, the AWB processing and the mask processing according to this embodiment will be described with reference to FIG. 15. FIG. 15 is a flowchart showing the overall operation flow of the AE processing, the AWB processing and the mask processing according to this embodiment. In the following description, the video camera 100 carries out both the AE processing and the AWB processing, however, the present invention is not limited to this embodiment.

As shown in FIG. 15, the AE detection frame 20 and the WB detection frame are first set in step S30. The AE frame signal generating circuit 200 of the AE detecting circuit 122 generates the AE frame signal 202 representing the AE detection frame 20 on the basis of the AE detection frame setting signal 136 from the micon 135 and the image position information 142 from the SG circuit 131. The WB frame signal generating circuit 300 of the WB detecting circuit 125 generates the WB frame signal 302 representing the WB detection frame on the basis of the WB detection frame setting signal 137 from the micon 135 and the image position information 142 from the SG circuit 131.

Subsequently, the mask frame 30 is set in step S32. For example, the mask frame 30 is set on the basis of manually-input information indicating a mask area or setting information which is set in advance, and the mask frame setting signal 138 is output to the mask generating circuit 139. The mask generating circuit 139 generates the mask signal 140 representing the mask frame 20 on the basis of the mask frame setting signal 138 from the micon 135 and the image position information 142 from the SG circuit 131. The step S32 corresponds to the mask target area specifying step of this embodiment.

Furthermore, the inside of the mask frame 30 is masked in step S34. When A/D-converted image information is input, the mask circuit 154 masks the mask area on the basis of the mask signal 140 from the mask generating circuit 139. That is, the mask circuit 154 replaces the signal level of the image information of the mask area with the mask level (for example, "0")

Thereafter, the image signal within the detection frame is integrated in step S36. The brightness signal 152 is input from the YC generating circuit 121 to the AE integrating circuit 210. The AE integrating circuit 210 integrates the signal level of the brightness signal 152 in the overall area within the AE detection frame 20 over one field to perform the AE detection. Furthermore, the RGB signal 153 is input from the RGB matrix circuit 114 to the WB integrating circuit 310. The WB integrating circuit 310 integrates the signal level of the RGB signal 153 in the overall area within the WB detection frame over one field to perform the WB detection. In the above detection step, the signal level of the image signal of the mask area is replaced with, for example "0" in step S34, and thus the signal level of the image signal of the mask area has no effect on the integration result.

Subsequently, the detection result is normalized in step S38. The micon 135 divides the 1-field integration value corresponding to the detection result of the AE detecting circuit 122 by the number of pixels detected to thereby normalize the 1-field integration value and calculate the average brightness level. The number of pixels detected is defined as a value achieved by subtracting the number of the pixels of the mask area overlapped with the inside area of the AE detection frame 20 from the number of the pixels of the inside area of the AE detection frame 20. The micon 135 calculates the signal level ratio of the R signal, the G signal and the B signal from the 1-field integration value corresponding to the detection result of the WB detecting circuit 125.

Furthermore, the AE and WB control amounts are renewed in step S40. The micon 135 compares the average brightness level thus calculated with the target value and renews the control amount of each device such as the lens 101 or the like so as to achieve suitable exposure, thereby performing the AE adjustment. Furthermore, the micon 135 renews the control amount for the WB circuit 127 on the basis of the calculated signal level ratio of the R signal, the G signal and the B signal, whereby the gain of each signal of the amplifier in the WB circuit 127 is increased/reduced, and the white balance is automatically adjusted. The steps S34 to S40 correspond to the image processing step according to this embodiment.

Thereafter, it is judged in step S42 whether the image pickup operation of the video camera 100 is finished or not. If the image pickup is continued, the processing returns to the step S36 to detect the image signal of a next field. During this period, the mask area of the output image is still kept masked at all times.

As described above, the video camera 100 having the mask function according to this embodiment masks the inside area of the mask frame 30 before the AE/WB detection is carried out, and sets the signal level of the image of the mask area to, for example "0" in advance, so that the image information of the mask area does not affect the image adjustment of the non-masked area. Therefore, the image processing such as the AE processing and the AWB processing can be suitably performed. Furthermore, the circuit construction of the video camera 100 is relatively simple.

The preferred embodiments of the present invention have been described with reference to the accompanying drawings and the invention is not limited to these embodiments. However, it is apparent to persons skilled in the art that various alterations or modifications may be carried out without departing from the subject matter of the present invention, and it is comprehensible that these alterations and modifications are encompassed by the subject matter of the present invention.

For example, in the above embodiments, the video camera 100 is cited as an example of the image pickup device. However, the present invention is not limited to this example, and for example, a digital still camera, VTR, a television receiver, a projector, a printer, etc. may be applied. Furthermore, the video camera 100 may contain not only a monitoring camera, but also a video camera for business use, a video camera for domestic use, etc.

Furthermore, in the above embodiments, a complementary-color single panel CCD is used as the CCD sensor. However, the present invention is not limited to this embodiment, and a primary-color multi-panel CCD may be used. Furthermore, the image sensor is not limited to the CCD sensor, and a CMOS sensor, VMIS or the like may be used.

In the above embodiments, the video camera 100 having both the AE function and the AWB function as the image quality adjusting function is used. The present invention is not limited to these embodiments. For example, an image pickup device which has at least any one of the AE function and the AWB function or further has an image quality adjusting function other than the AE function and the AWB function may be used.

The circuit construction of the image pickup device is not limited to the circuit construction of the video camera 100 according to the above embodiments. It may be added with various kinds of sensors or circuits or some parts may be eliminated from it.

One or more mask areas may be provided on an image. The shape of the mask area is not limited to a rectangle, and it may be set to various shapes such as a circular shape, elliptic shape, a triangular shape, a star-like shape or the like. Further, provision of a mask area is not limited to privacy protection. For example, a mask area may be provided to an area which is prominently bright or dark, an area in which monochromatic color is intensively broadened or the like in order to eliminate such an area from image pickup targets. For example, in such a case that the brightness of a room having a window is varied due to the difference in the light amount of light ray incident through the window between day and night when an image of the room is picked up by a monitoring camera, a mask area may be set to cover the window to stably detect the brightness level of the room.

As described above, according to the present invention, in the image pickup device having the mask function, the image information of the mask target area can be prevented from affecting the image quality adjustment of the overall image. Therefore, the image processing such as the automatic exposure processing, the automatic white balance processing, etc. can be properly performed, and the image quality of the output image can be enhanced.

What is claimed is:

1. An image pickup device having a mask function, comprising:
    mask area setting means for setting a mask area to be masked in a pickup image area, wherein said pickup image area includes the mask area and
    (i) is an area of an optical image detected by an image sensor that photoelectrically converts the optical image within the pickup image area into an image signal, and
    (ii) is to be displayed with the mask area being included within the displayed pickup image area and being masked such that an image representing the image signal of the pickup image area is not displayed in the mask area, the image representing the image signal of the pickup image area thereby not being viewable in the masked area by viewers of the displayed pickup image area;
    image processing means for subjecting the image signal of the pickup image area to image processing while removing, independent of a signal level of the image signal of the pickup image area within the mask area, the mask area set by said mask area setting means from the pickup image area, wherein the image signal subjected to processing is generated by said image sensor and is provided for generating a displayed image of the pickup image area; and
    wherein said image processing means generates a signal representing an integral of a signal level of a RGB signal over a plurality of pixels within the pickup image area and excluding, independent of the signal level of the image signal of the pickup image area within the mask area, said mask area.

2. The image pickup device as claimed in claim 1, wherein an offset signal for the image signal of the mask area set by said mask area setting means is input to said image processing means to remove the image signal contained in the mask area from an image processing target.

3. The image pickup device as claimed in claim 1, wherein the image processing is automatic exposure processing.

4. The image pickup device as claimed in claim 1, wherein the image processing is automatic white balance processing.

5. An image pickup device having a mask function, comprising:
    mask area setting means for setting a mask area to be masked in a pickup image area, wherein said pickup image area includes the mask area and
    (i) is an area of an optical image detected by an image sensor that photoelectrically converts the optical image within the pickup image area into an image signal, and
    (ii) is to be displayed with the mask area being included within the displayed pickup image area and being masked such that an image representing the image signal of the pickup image area is not displayed in the mask area, the image representing the image signal of the pickup image area thereby not being viewable in the masked area by viewers of the displayed pickup image area;

image signal generating means for generating an image signal achieved by removing, independent of a signal level of the image signal of the mask area, the image signal of the mask area from the image signal of the pickup image area, wherein the image signal of the pickup area is generated by said image sensor and is provided for generating a displayed image of the pickup image area; and signal processing means for subjecting the image signal generated by said image signal generating means to image processing;

wherein said signal processing means generates a signal representing an integral of a signal level of a RGB signal over a plurality of pixels within the pickup image area and excluding, independent of the signal level of the image signal of the mask area, said mask area.

6. The image pickup device as claimed in claim 5, wherein the signal level of the image signal of the mask area is replaced by a mask level to generate the image signal achieved by removing the image signal of the mask area from the image signal of the pickup image area.

7. An image pickup method for an image pickup device having a mask function, comprising the steps of:

setting a mask area to be masked in a pickup image area that includes the mask area and
(i) is an area of an optical image detected by an image sensor that photoelectrically converts the optical image within the pickup image area into an image signal,
(ii) is to be displayed with the mask area being included within the displayed pickup image area and being masked such that an image representing the image signal of the pickup image area is not displayed in the mask area, the image representing the image signal of the pickup image area thereby not being viewable in the masked area by viewers of the displayed pickup image area;

subjecting the image signal of the pickup image area to image processing while removing, independent of a signal level of the image signal of the pickup image area within the mask area, the mask area thus set from the pickup image area, wherein the image signal subjected to processing is generated by said image sensor and is provided for generating a displayed image of the pickup image area; and wherein said subjecting step generates a signal representing an integral of a signal level of a RGB signal over a plurality of pixels within the pickup image area and excluding, independent of the signal level of the image signal of the pickup image area within the mask area, said mask area.

8. The image pickup method as claimed in claim 7, further comprising the step of applying an offset signal for the image signal of the mask area when the image processing is carried out on the image signal of the pickup image area, thereby removing the image signal contained in the mask area from a processing target.

9. The image pickup method as claimed in claim 7, wherein the image processing is automatic exposure processing.

10. The image pickup method as claimed in claim 7, wherein the image processing is automatic white balance processing.

11. An image pickup method for an image pickup device having a mask function, comprising the steps of:

setting a mask area to be masked in a pickup image area that includes the mask area and
(i) is an area of an optical image detected by an image sensor that photoelectrically converts the optical image within the pickup image area into an image signal, and
(ii) is to be displayed with the mask area being included within the displayed pickup image area and being masked such that an image representing the image signal of the pickup image area is not displayed in the mask area, the image representing the image signal of the pickup image area thereby not being viewable in the masked area by viewers of the displayed pickup image area;

generating an image signal achieved by removing, independent of a signal level of the image signal of the mask area, the image signal of the mask area thus set from the image signal of the pickup image area, wherein the image signal subjected to processing is generated by said image sensor and is provided for generating a displayed image of the pickup image area; and subjecting the image signal thus generated to image processing;

wherein said subjecting step generates a signal representing an integral of a signal level of a RGB signal over a plurality of pixels within the pickup image area and excluding, independent of the signal level of the image signal of the pickup image area within the mask area, said mask area.

12. The image pickup method as claimed in claim 11, further comprising the step of replacing the signal level of the image signal of the mask area with a mask level to generate an image signal achieved by removing the image signal of the mask area from the image signal of the pickup image area.

13. The image pickup device as claimed in claim 1, further comprising means for providing an output image signal that comprises the mask area masked within the pickup image area.

14. The image pickup device as claimed in claim 5, further comprising means for providing an output image signal that comprises the mask area masked within the pickup image area.

15. The image pickup method as claimed in claim 7, further comprising providing an output image signal that comprises the mask area masked within the pickup image area.

16. The image pickup method as claimed in claim 11, further comprising providing an output image signal that comprises the mask area masked within the pickup image area.

* * * * *